(12) United States Patent
Aiba

(10) Patent No.: US 10,630,634 B2
(45) Date of Patent: Apr. 21, 2020

(54) INFORMATION PROCESSING APPARATUS AND NON-TRANSITORY COMPUTER READABLE RECORDING MEDIUM

(71) Applicant: KYOCERA Document Solutions Inc., Osaka-shi, Osaka (JP)

(72) Inventor: Masaaki Aiba, Osaka (JP)

(73) Assignee: KYOCERA DOCUMENT SOLUTIONS, INC., Osaka-Shi, Osaka (JP)

( * ) Notice: Subject to any disclaimer, the term of this patent is extended or adjusted under 35 U.S.C. 154(b) by 110 days.

(21) Appl. No.: 16/130,056

(22) Filed: Sep. 13, 2018

(65) Prior Publication Data
US 2019/0089672 A1  Mar. 21, 2019

(51) Int. Cl.
| | |
|---|---|
| G06F 15/16 | (2006.01) |
| H04L 29/12 | (2006.01) |
| G06F 1/3234 | (2019.01) |
| G06F 1/3293 | (2019.01) |
| H04L 29/08 | (2006.01) |
| G03G 15/00 | (2006.01) |

(52) U.S. Cl.
CPC ........ H04L 61/1541 (2013.01); G06F 1/3284 (2013.01); G06F 1/3293 (2013.01); H04L 61/103 (2013.01); H04L 61/1511 (2013.01); H04L 61/2069 (2013.01); G03G 15/5004 (2013.01); H04L 67/16 (2013.01)

(58) Field of Classification Search
CPC ............... H04L 61/1541; H04L 61/103; H04L 61/1511; H04L 61/2069; H04L 67/16; G06F 1/3284; G06F 1/3293; G03G 15/5004

USPC .......................................................... 709/245
See application file for complete search history.

(56) References Cited

U.S. PATENT DOCUMENTS

| | | | | |
|---|---|---|---|---|
| 2011/0078464 | A1* | 3/2011 | Yokomizo | G06F 1/3203 713/300 |
| 2014/0214958 | A1* | 7/2014 | Cheshire | H04L 61/1511 709/204 |
| 2015/0019759 | A1* | 1/2015 | Tran | H04L 41/0886 709/245 |
| 2015/0201035 | A1* | 7/2015 | Profit | H04L 67/2842 709/213 |

(Continued)

FOREIGN PATENT DOCUMENTS

| | | |
|---|---|---|
| EP | 2306267 A2 | 4/2011 |
| JP | 2010094925 | 4/2010 |

OTHER PUBLICATIONS

Search Report for European Patent Application No. 18193085.0 dated Jan. 29, 2019.

(Continued)

*Primary Examiner* — Atta Khan
(74) *Attorney, Agent, or Firm* — Calfee, Halter & Griswold LLP

(57) ABSTRACT

A sub processor, in the sleep mode, receives an mDNS query from the external device via the communication interface, then determines whether or not the mDNS query is a service discovery query, if determining that the mDNS query is not a service discovery query, determines that the mDNS query is a name resolution query, generates the response based on the name resolution RR, and sends the response to the external device via the communication interface.

7 Claims, 9 Drawing Sheets

(56) References Cited

U.S. PATENT DOCUMENTS

2015/0378647 A1* 12/2015 Sakabe ................ G06F 3/1229
358/1.14

OTHER PUBLICATIONS

S. Cheshire and M. Krochmal, Apple Inc S: "DNS-Based Service Discovery;rfc6763.txt", Internet Engineering Task Force, IETF; Standard, Internet Society (ISOC) 4, Rue Des Dalaises CH-1205 Geneva, Switzerland, Feb. 20, 2013 (Feb. 20, 2013), pp. 1-49.

* cited by examiner

| NAME | TYPE | RDATA |
|---|---|---|
| <HostName>.local | A | IPv4 address |
| <HostName>.local | AAAA | IPv6 address (1) |
| <HostName>.local | AAAA | IPv6 address (2) |
| <HostName>.local | AAAA | ... |
| <IPv4addr>.in-addr.arpa | PTR | <HostName>.local |
| <IPv6addr[0]>.in-addr.arpa | PTR | <HostName>.local |
| <IPv6addr[0]>.in-addr.arpa | PTR | <HostName>.local |
| | ... | ... |

FIG.7

| NAME | TYPE |
|---|---|
| _ipps._tcp.local | PTR |
| <DeviceName>._ipps._tcp.local | SRV |
| <DeviceName>._ipps._tcp.local | TXT |
| ... | ... |

FIG.8

INFORMATION PROCESSING APPARATUS AND NON-TRANSITORY COMPUTER READABLE RECORDING MEDIUM

INCORPORATION BY REFERENCE

This application claims the benefit of Japanese Priority Patent Applications JP 2017-179673 filed Sep. 20, 2017 and JP 2018-059506 filed Mar. 27, 2018, the entire contents of which are incorporated herein by reference.

FIELD

The present disclosure relates to an information processing apparatus selectively executable a normal mode and a sleep mode. The present disclosure further relates to a non-transitory computer readable recording medium that records an information processing program.

BACKGROUND

There is known a technology called proxy response. An information processing apparatus includes a main controller and a sub controller. During a sleep mode, a sub controller responds to a query received from an external device connected to a network (so-called proxy response).

During the sleep mode, if the sub controller receives a query of a type that the sub controller cannot respond to that, the sub controller requests the main controller to recover from the sleep mode (to wake up), and transfers the query to the main controller. The main controller recovers from the sleep mode to start the normal mode, and responds to the query. The same applies to a case where the sub controller receives a query of a type that the sub controller cannot determine whether or not the sub controller can respond to that.

From a viewpoint of saving energy of an information processing apparatus, it is desirable for a sub controller to respond to queries of more types without recovering from the sleep mode to start the normal mode.

SUMMARY

According to an embodiment of the present disclosure, there is provided an information processing apparatus, including:
a sub controller including a sub memory and a sub processor, the sub memory storing a proxy response database including a name resolution RR (Resource Record) that is used to generate a response in response to a name resolution query based on an mDNS (Multicast Domain Name System) protocol;
a main controller including a main memory and a main processor, the main memory storing a service discovery RR that is used to generate a response in response to a service discovery query based on the mDNS protocol, the main controller informing the sub processor that the main controller shifts to a sleep mode and recovers from the sleep mode; and
a communication interface communicative with an external device connected to a network,
in which the sub processor, in the sleep mode,
receives an mDNS query from the external device via the communication interface, then
determines whether or not the mDNS query is a service discovery query,
if determining that the mDNS query is not a service discovery query,
determines that the mDNS query is a name resolution query,
generates the response based on the name resolution RR, and
sends the response to the external device via the communication interface.

According to an embodiment of the present disclosure, there is provided a non-transitory computer readable recording medium that records an information processing program for an information processing apparatus including
a sub controller including a sub memory and a sub processor, the sub memory storing a proxy response database including a name resolution RR (Resource Record) that is used to generate a response in response to a name resolution query based on an mDNS (Multicast Domain Name System) protocol,
a main controller including a main memory and a main processor, the main memory storing a service discovery RR that is used to generate a response in response to a service discovery query based on the mDNS protocol, the main controller informing the sub processor that the main controller shifts to a sleep mode and recovers from the sleep mode, and
a communication interface communicative with an external device connected to a network,
the program causing the sub processor, in the sleep mode of the main controller:
to receive an mDNS query from the external device via the communication interface; then
to determine whether or not the mDNS query is a service discovery query;
if determining that the mDNS query is not a service discovery query,
to determine that the mDNS query is a name resolution query;
to generate the response based on the name resolution RR; and
to send the response to the external device via the communication interface.

These and other objects, features and advantages of the present disclosure will become more apparent in light of the following detailed description of best mode embodiments thereof, as illustrated in the accompanying drawings.

BRIEF DESCRIPTION OF FIGURES

FIG. 7 shows an example of the proxy response database;
FIG. 8 shows an example of an unsupported service database.

DETAILED DESCRIPTION

Hereinafter, with reference to the drawings, (I) the mDNS (Multicast Domain Name System) protocol, based on which an embodiment of the present disclosure has been made, will be described firstly, and (II) an embodiment of the present disclosure will be described later.

I. mDNS Protocol

1. Overview

Devices manufactured by Apple (registered trademark) such as iPhone (registered trademark) and iPad (registered trademark) execute service discovery (DNS-SD, DNS based Service Discovery) and name resolution by using mDNS protocols.

The service discovery is a protocol for obtaining information such as types of services (functions) supported by devices, communication ports, and print formats. A query-sender device multicasts an mDNS service discovery query to a plurality of devices connected to a network. A device receives the mDNS service discovery query, determines that the device should respond to the query, then generates a response packet, and sends the response packet to the query-sender device.

The name resolution is a protocol for obtaining the IP address of a device based on a host name (forward lookup), and obtaining the host name of a device based on an IP address (reverse lookup). A query-sender device multicasts an mDNS name resolution query to a plurality of devices connected to a network. A device receives the mDNS name resolution query, determines that the device should respond to the query, then generates a response packet, and sends the response packet to the query-sender device.

2. Service Discovery of mDNS Protocol mDNS queries and responses for typical service discovery will be described.

Figure 1:
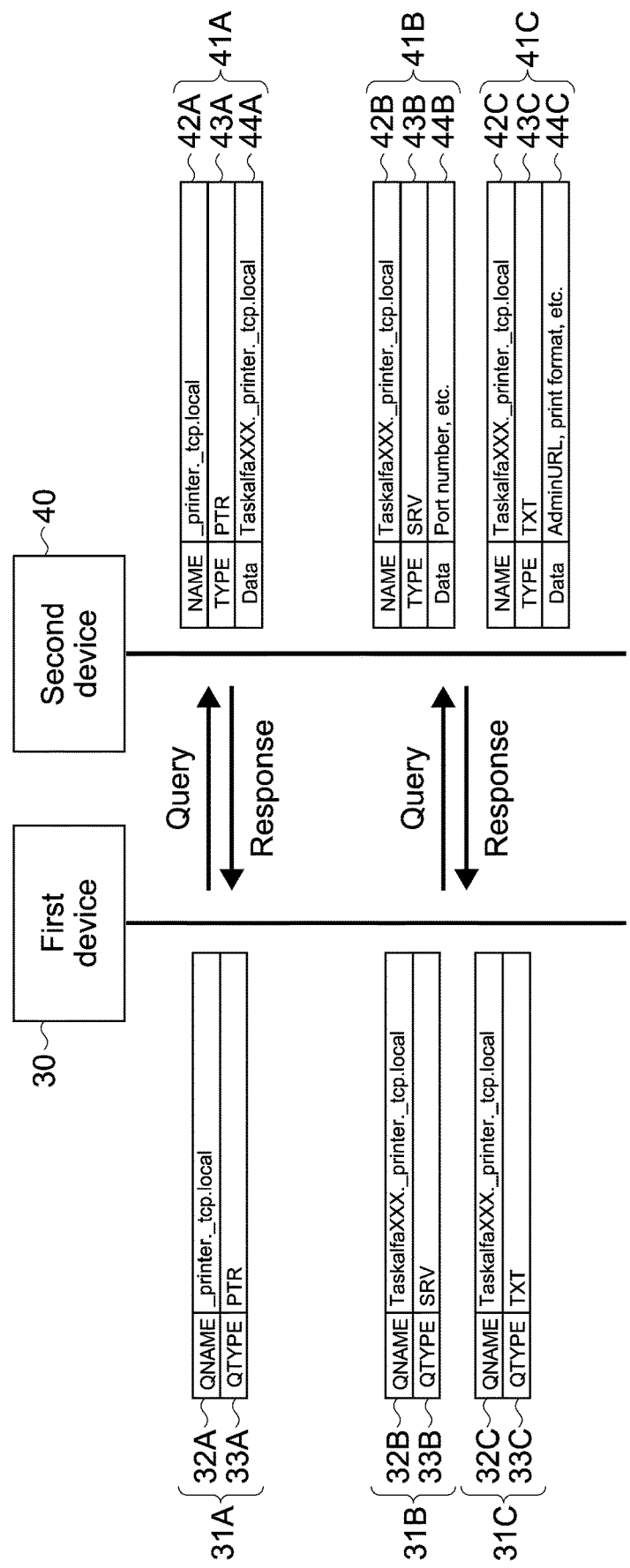
FIG. 1 show an example of mDNS queries and responses for the service discovery.

FIG. 1 show an example of mDNS queries and responses for the service discovery.

The query-sender device (hereinafter, referred to as first device) 30 generates the first mDNS query packet 31A. The first mDNS query packet 31A includes the QNAME (name) 32A and the QTYPE (type) 33A. The QNAME 32A describes the type of a service, which is a target of the query. In this example, the QNAME 32A describes "_printer._tcp.local" (printing by local printer). The QTYPE 33A describes "PTR" (Pointer). "PTR" is a pointer that points out NAME. The first device 30 multicasts the generated first mDNS query packet 31A. The query-responder device (hereinafter, referred to as second device) 40 receives the first mDNS query packet 31A.

Figure 2:
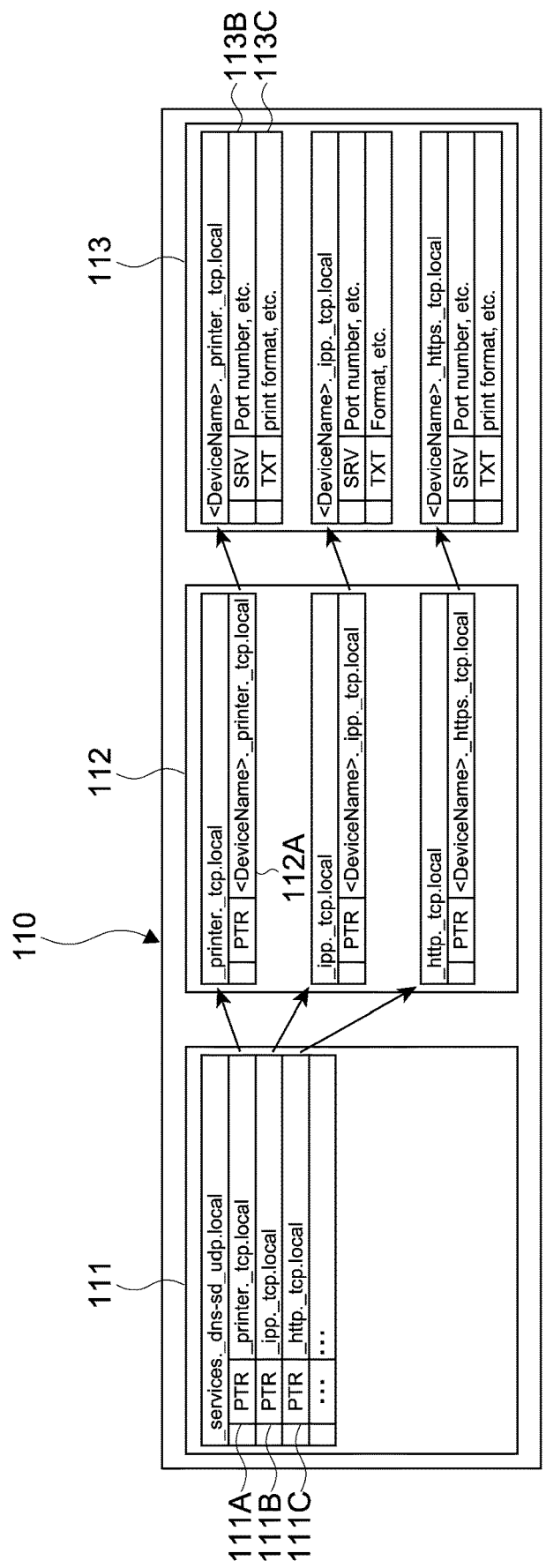
FIG. 2 shows an example of a service discovery RR (Resource Record)

FIG. 2 shows an example of a service discovery RR (Resource Record).

The second device 40 locally stores the service discovery RR 110. The service discovery RR 110 is a layer-structure database including the service information 111 (upper layer), the device name information 112 (middle layer), and the service detailed information 113 (lower layer). In this example, the second device 40 is an image forming apparatus (MFP (Multifunction Peripheral)).

The service information 111 is a list of services supported by the second device 40. In this example, the service information 111 includes services such as "_printer._tcp.local" 111A (printing by local printer), "_ipp._tcp.local" 111B (Internet Printing Protocol, remote printing via the Internet), and "_http_tcp.local" 111C (Web server).

The device name information 112 is a name of a device that executes a service in the service information 111. <DeviceName> of the device name information 112 describes a specific device name, in fact. Hereinafter, a specific device name is "TaskalfaXXX".

The service detailed information 113 is detailed information of a service executed by a device, which has a name <DeviceName> in the device name information 112. "SRV" means service information (port number). "TXT" means service additional information (print format, adminURL, etc.).

The second device 40 reads "_printer._tcp.local" described in the QNAME 32A and "PTR" described in the QTYPE 33A from the received first mDNS query packet 31A. With reference to the service discovery RR 110, the second device 40 reads "_printer._tcp.local" 111A, which is completely the same as the QNAME 32A, from the service information 111. The second device 40 reads "<DeviceName>._printer._tcp.local" 112A (in this example, "TaskalfaXXX._printer._tcp.local") corresponding to the QTYPE 33A "PTR" from the device name information 112, which is a layer immediately below the service information "_printer._tcp.local" 111A.

The second device 40 generates the first mDNS response packet 41A. The first mDNS response packet 41A includes the NAME 42A "_printer._tcp.local", which is the same as the QNAME 32A in the first mDNS query packet 31A, the TYPE 43A "PTR", which is the same as the QTYPE 33A in the first mDNS query packet 31A, and "TaskalfaXXX._printer._tcp.local" 112A read from the device name information 112 as the DATA 44A. The second device 40 sends the generated first mDNS response packet 41A to the first device 30.

The first device 30 multicasts the second mDNS query packet 31B and the third mDNS query packet 31C. In the second mDNS query packet 31B, the QNAME 32B describes "TaskalfaXXX._printer._tcp.local", and the QTYPE 33B describes "SRV". In the third mDNS query packet 31C, the QNAME 32C describes "TaskalfaXXX._printer._tcp.local", and the QTYPE 33C describes "TXT".

The second device 40 reads "TaskalfaXXX._printer._tcp.local" described in the QNAME 32B and "SRV" described in the QTYPE 33B from the received second mDNS query packet 31B. With reference to the service discovery RR 110, the second device 40 reads "<DeviceName>._printer._tcp.local" 112A (in this example, "TaskalfaXXX._printer._tcp.local"), which is completely the same as the QNAME 32B, from the device name information 112. The second device 40 reads "port number, etc." 113B corresponding to the QTYPE 33B "SRV" from the service detailed information 113, which is a layer immediately below the device name information "<DeviceName>._printer._tcp.local" 112A (in this example, "TaskalfaXXX._printer._tcp.local").

The second device 40 generates the second mDNS response packet 41B. The second mDNS response packet 41B includes the NAME 42B "TaskalfaXXX._printer._tcp.local", which is the same as the QNAME 32B in the second mDNS query packet 31B, the TYPE 43B "SRV", which is the same as the QTYPE 33B in the second mDNS query packet 31B, and "port number, etc." 113B read from the service detailed information 113 as the DATA 44B.

The second device 40 reads "TaskalfaXXX._printer._tcp.local" described in the QNAME 32C and "TXT" described in the QTYPE 33C from the received third mDNS query packet 31C. With reference to the service discovery RR 110, the second device 40 reads "<DeviceName>._printer._tcp.local" 112A (in this example, "TaskalfaXXX._printer._tcp.local"), which is completely the same as the QNAME 32C, from the device name information 112. The second device 40 reads "print format, etc." 113C corresponding to the QTYPE 33C "TXT" from the service detailed information 113, which is a layer immediately below the device name information "<DeviceName>._printer._tcp.local" 112A (in this example, "TaskalfaXXX._printer._tcp.local").

The second device 40 generates the third mDNS response packet 41C. The third mDNS response packet 41C includes the NAME 42C "TaskalfaXXX._printer._tcp.local", which is the same as the QNAME 32C in the third mDNS query packet 31C, the TYPE 43C "TXT", which is the same as the QTYPE 33C in the third mDNS query packet 31C, and "print format, etc." 113C read from the service detailed information 113 as the DATA 44C. The second device 40 sends the generated second mDNS response packet 41B and the generated third mDNS response packet 41C to the first device 30.

3. Name Resolution of mDNS Protocol

Figure 3:
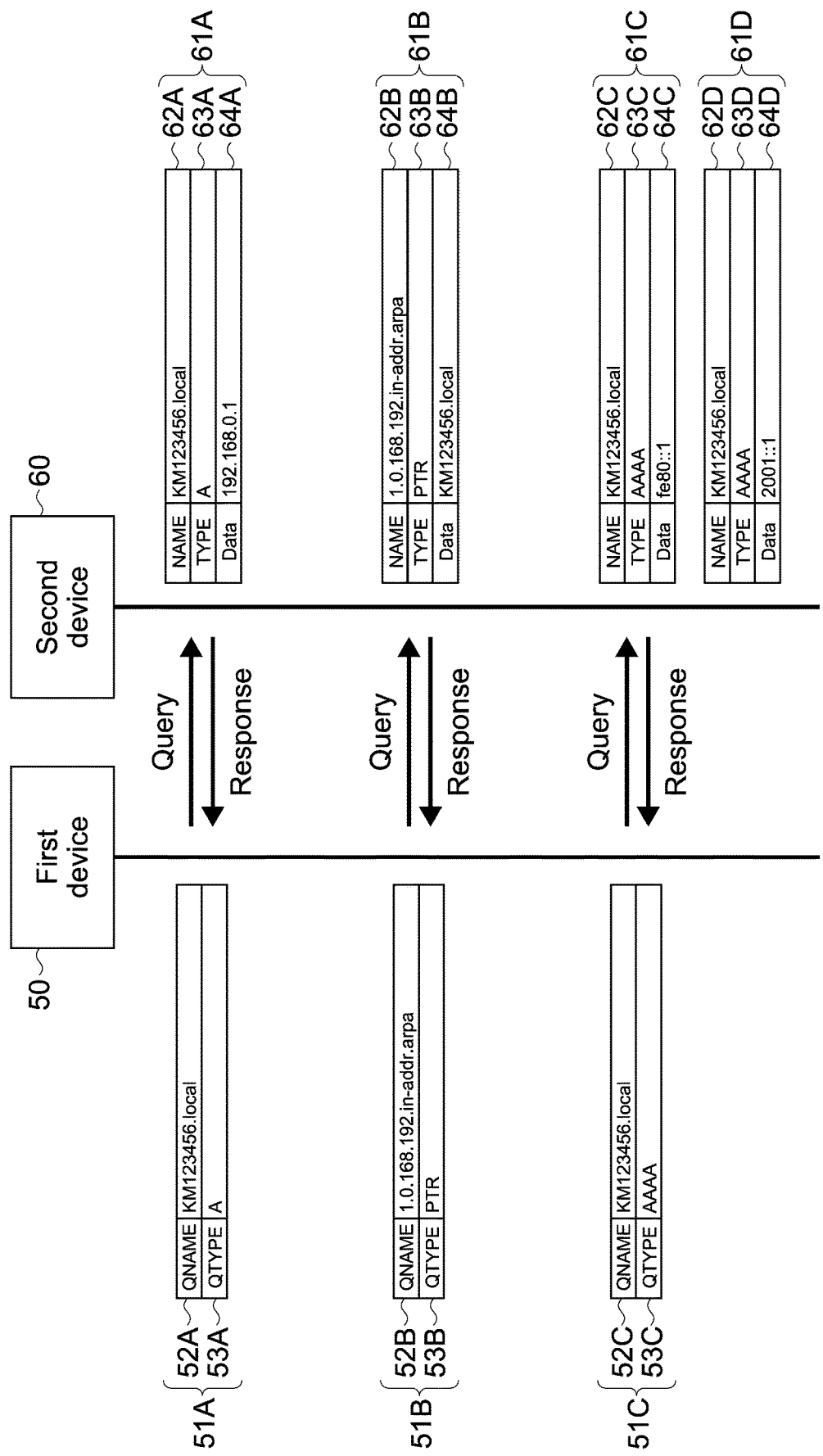
FIG. 3 shows an example of mDNS queries and responses for name resolution.

FIG. 3 shows an example of mDNS queries and responses for name resolution.

(1) Example 1

The query-sender device (hereinafter, referred to as first device) 50 generates the first mDNS query packet 51A. The first mDNS query packet 51A includes the QNAME (name) 52A and the QTYPE (type) 53A. The QNAME 52A describes a host name, which is a target of the query. In this example, the QNAME 52A describes "KM123456.local" as "<HostName>.local". The QTYPE 53A describes "A". "A" means IPv4 name resolution. The first device 50 multicasts the generated first mDNS query packet 51A. The query-responder device (hereinafter, referred to as second device) 60 receives the first mDNS query packet 51A.

Figure 4:
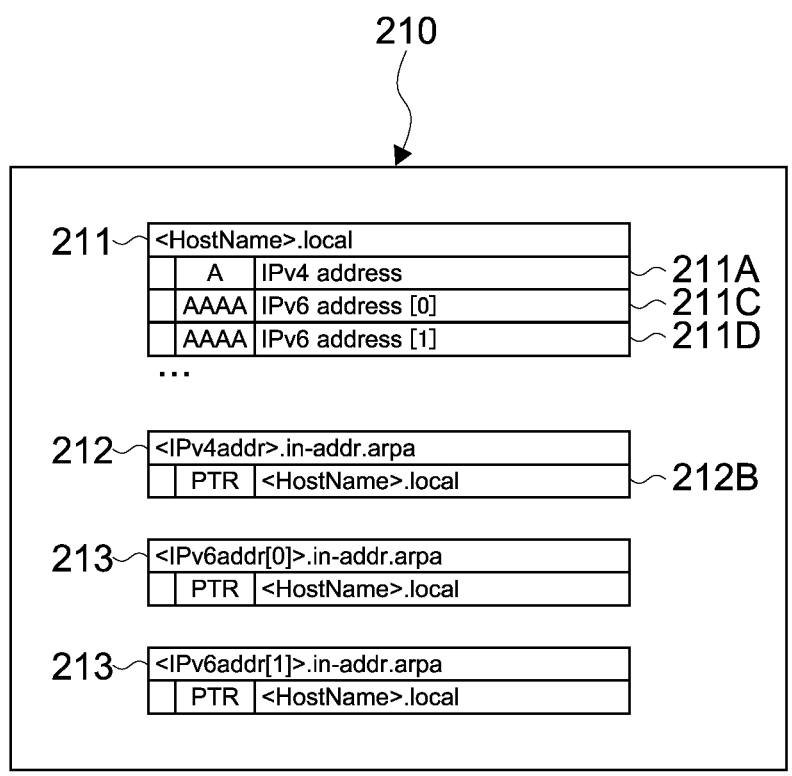
FIG. 4 shows an example of a name resolution RR.

FIG. 4 shows an example of a name resolution RR.

The second device 60 locally stores the name resolution RR 210. In this example, the name resolution RR 210 includes the first record 211, the second record 212, and the plurality of third records 213.

The first record 211 is used for resolution (forward lookup) of an IP address (IPv4 address, IPv6 address) based on a host name. In other words, if a name resolution query is a query for "A" (which means IPv4 name resolution) of "<HostName>.local", a device responds the IPv4 address "A" described in the first record 211. Similarly, if a name resolution query is a query for "AAAA" (which means IPv6 name resolution) of "<HostName>.local", a device responds the IPv4 IPv6 addresses "AAAA" (plural) described in the first record 211. <HostName> describes a specific host name, in fact. In this example, <HostName> of the second device 60 is "KM123456". "IPv4 address" describes a specific address, in fact. In this example, the IPv4 address of the second device 60 is "192.168.0.1". Each of "IPv6 address [0]" and "IPv6 address [1]" describes a specific IPv6 address, in fact. In this example, "IPv6 address [0]" of the second device 60 is "2001::1", and "IPv6 address [1]" of the second device 60 is "fe80::1".

The second record 212 is used for resolution (reverse lookup) of a host name based on an IP address (IPv4 address). In other words, if a name resolution query is a query for "PTR" (which points out NAME) of "<IPv4addr>.in-addr.arpa", a device responds the host name "<HostName>.local" described as "PTR" in the second record 212. <IPv4addr> describes specific IPv4 addresses in the reverse order, in fact. For example, if the IPv4 address of the second device 60 is "192.168.0.1", <IPv4addr> of the second record 212 describes "1.0.168.192".

Each third record 213 is used for resolution (reverse lookup) of a host name based on an IP address (IPv6 address). In other words, if a name resolution query is a query for "PTR" (which points out NAME) of "<IPv6addr[0]>.in-addr.arpa", a device responds the host name "<HostName>.local" described as "PTR" in the third record 213. <IPv6addr[0]> or <IPv6addr[1]> describes specific IPv6 addresses in the reverse order, in fact. In this example, <IPv6addr[0]> of the second device 60 is "2001::1", and <IPv6addr[1]> of the second device 60 is "fe80::1". The number of IPv6 addresses is the same as the number of the third records 213.

The second device 60 reads "KM123456.local" described in the QNAME 52A and "A" described in the QTYPE 53A from the received first mDNS query packet 51A. With reference to the name resolution RR 210, the second device 60 reads, from the first record 211, the IPv4 address (in this example, "192.168.0.1") 212A corresponding to the QTYPE 53A "A" in association with "KM123456.local", which is completely the same as the QNAME 52A.

The second device 60 generates the first mDNS response packet 61A. The first mDNS response packet 61A includes the NAME 62A "KM123456.local", which is the same as the QNAME 52A in the first mDNS query packet 51A, the TYPE 63A "A", which is the same as the QTYPE 53A in the first mDNS query packet 51A, and the IPv4 address "192.168.0.1" 212A read from the first record 211 as the DATA 64A. The second device 60 sends the generated first mDNS response packet 61A to the first device 50.

(2) Example 2

The first device 50 multicasts the second mDNS query packet 51B. In the second mDNS query packet 51B, the QNAME 52B describes "1.0.168.192.in-addr.arpa". The QTYPE 53B describes "PTR".

The second device 60 reads "1.0.168.192.in-addr.arpa" described in the QNAME 52B and "PTR" described in the QTYPE 53B from the received second mDNS query packet 51B. With reference to the name resolution RR 210, the second device 60 reads the host name (in this example, "KM123456.local") 212B corresponding to the QTYPE 53B "PTR" in association with "1.0.168.192.in-addr.arpa", which is completely the same as the QNAME 52B, from the second record 212.

The second device 60 generates the second mDNS response packet 61B. The second mDNS response packet 61B includes the NAME 62B "1.0.168.192.in-addr.arpa", which is the same as the QNAME 52B in the second mDNS query packet 51B, the TYPE 63B "PTR", which is the same as the QTYPE 53B in the second mDNS query packet 51B, and the host name "KM123456.local" 212B read from the second record 212 as the DATA 64B. The second device 60 sends the generated second mDNS response packet 61B to the first device 50.

(3) Example 3

The first device 50 multicasts the third mDNS query packet 51C. In the third mDNS query packet 51C, the QNAME 52C describes "KM123456.local". The QTYPE 53C describes "AAAA".

The second device 60 reads "KM123456.local" described in the QNAME 52C and "AAAA" described in the QTYPE 53C from the received third mDNS query packet 51C. With reference to the name resolution RR 210, the second device 60 reads the IPv6 addresses (in this example, "2001::1", "fe80::1") 211C and 211D corresponding to the QTYPE 53C "AAAA" in association with "KM123456.local", which is completely the same as the QNAME 52C, from the first record 211.

The second device 60 generates the third mDNS response packet 61C. The third mDNS response packet 61C includes the NAME 62C "KM123456.local", which is the same as the QNAME 52C in the third mDNS query packet 51C, the TYPE 63C "AAAA", which is the same as the QTYPE 53C in the third mDNS query packet 51C, and the IPv6 address "2001::1" 211C read from the first record 211 as the DATA 64C.

The second device 60 generates the fourth mDNS response packet 61D. The fourth mDNS response packet 61D includes the NAME 62D "KM123456.local", which is the same as the QNAME 52C in the third mDNS query packet 51C, the TYPE 63D "AAAA", which is the same as the QTYPE 53C in the third mDNS query packet 51C, and the IPv6 address "fe80::1" 211D read from the first record 211 as the DATA 64D. The second device 60 sends the generated third mDNS response packet 61C and the generated fourth mDNS response packet 61D to the first device 50.

4. Conclusion of Overview

In many cases, an electronic device is selectively executable a normal mode and a sleep mode (main controller is powered off, and sub controller responds (proxy response)) for energy saving. In such an electronic device, if a sub controller receives an mDNS query packet in the sleep mode, typically, a main controller always recovers from the sleep mode to start the normal mode, and responds to the mDNS query. Since the data size of the RR is too large (see FIG. 2 and FIG. 4) and the process of generating a response packet is complicated (see FIG. 1 and FIG. 3), a low-spec sub controller cannot process the mDNS query.

However, in order to increase the energy saving performance, if the sub controller receives an mDNS query packet in the sleep mode, it is desirable for the main controller not to recover from the sleep mode to start the normal mode as many cases as possible, and it is desirable for the sub controller to respond to the mDNS query in the sleep mode (proxy response) as many cases as possible. In view of the aforementioned circumstances, according to the following embodiment, if a sub controller receives an mDNS query packet in a sleep mode, under specific conditions, a main controller does not recover from the sleep mode to start a normal mode, and the sub controller responds to the mDNS query in the sleep mode (proxy response).

II. Embodiment

1. Configuration of Information Processing Apparatus

Figure 5:
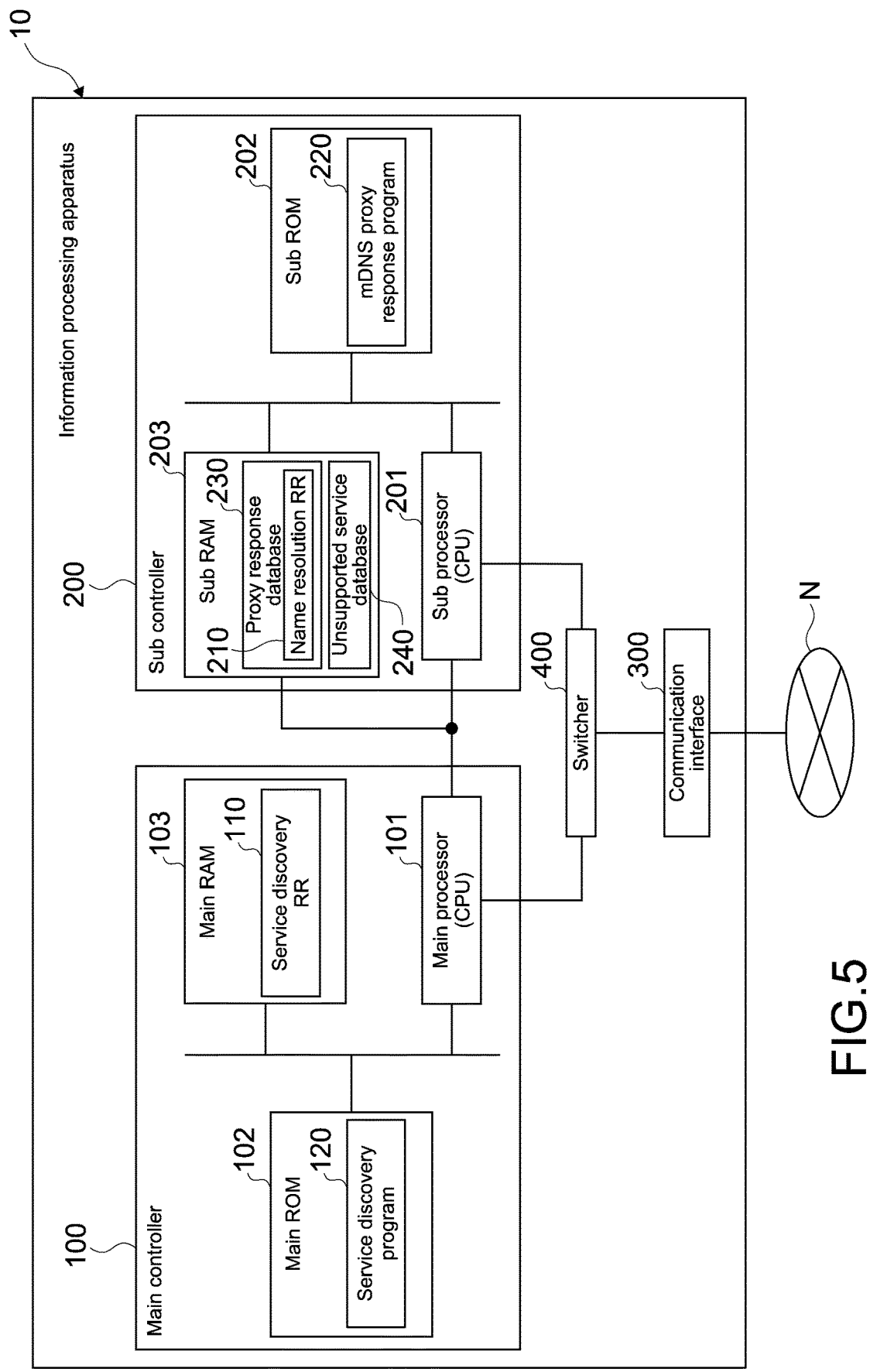
FIG. 5 shows a configuration of an information processing apparatus according to an embodiment of the present disclosure.

FIG. 5 shows a configuration of an information processing apparatus according to an embodiment of the present disclosure.

The information processing apparatus 10 is an image forming apparatus (MFP, etc.) or a personal computer (including various types such as desktop, laptop, tablet, smartphone, and wearable).

The information processing apparatus 10 includes the main controller 100, the sub controller 200, the communication interface 300, and the switcher 400, which are connected to each other via buses.

The main controller 100 executes various processing in the normal mode. The main controller 100 includes the main processor (CPU, Central Processing Unit) 101, the main ROM (Read Only Memory) 102, the main RAM (Random Access Memory) 103 (main memory), a dedicated hardware circuit, and the like. If the information processing apparatus 10 is an image forming apparatus, the main controller 100 is connected to an image scanner, a printer, an image memory, a display device, an operation device, a nonvolatile storage device (HDD (Hard Disk Drive), etc.) (not shown and not described). The main controller 100 controls the aforementioned hardware (not shown), the communication interface 300, and the switcher 400.

The main processor 101 loads various programs (including the service discovery program 120), which are stored in the main ROM 102, in the main RAM 103 and executes the programs. The main processor 101 shifts from the normal mode to the sleep mode under specific conditions (information is not received via a user's operation or via a network for a predetermined time period). During the normal mode, the main controller 100 is powered on (not shown). During the sleep mode, the main controller 100 is powered off. The main processor 101 informs the sub processor 201 of the sub controller 200 and the switcher 400 that the main processor 101 shifts from the normal mode to the sleep mode, and that the main processor 101 recovers from the sleep mode to start the normal mode.

The main ROM 102 stores the service discovery program 120. The service discovery program 120 is a program for responding to a service discovery query based on an mDNS protocol (method similar to that of FIG. 1).

The main RAM 103 (main memory) stores the service discovery RR 110. The service discovery RR 110 (structure similar to that of FIG. 2) is a database that the main processor 101 refers to when executing the service discovery program 120. For example, the main processor 101 may generate the service discovery RR 110 when the main processor 101 shifts from the normal mode to the sleep mode, and write the service discovery RR 110 in the main RAM 103.

During the sleep mode, the sub controller 200 responds to a query received via the network N (so-called proxy response). The sub controller 200 includes the sub processor (CPU) 201, the sub ROM 202, the sub RAM 203 (sub memory), a dedicated hardware circuit, and the like. The spec of each device of the sub controller 200 is lower than the spec of each device of the main controller 100. The sub controller 200 operates with lower power than the power with which the main controller 100 operates.

The sub processor 201 receives, from the main processor 101, information that the main processor 101 shifts from the normal mode to the sleep mode. During the sleep mode, the sub processor 201 loads various proxy response programs (including the mDNS proxy response program 220), which are stored in the sub ROM 202, in the sub RAM 203, and executes the proxy response programs. If a received query is a query of a type that the sub processor 201 cannot respond to that type (proxy response), the sub processor 201 requests the main processor 101 to recover from the sleep mode to start the normal mode, and transfers the query to the main processor 101.

The sub ROM 202 stores the mDNS proxy response program 220. The mDNS proxy response program 220 is a program for responding to a name resolution query based on an mDNS protocol (method similar to that of FIG. 3).

The sub RAM 203 (sub memory) stores the proxy response database 230 and the unsupported service database 240. For example, the main processor 101 may generate the proxy response database 230 and the unsupported service database 240 when the main processor 101 shifts from the normal mode to the sleep mode, and write the proxy response database 230 in the sub RAM 203.

FIG. 7 shows an example of the proxy response database.

The sub processor 201 refers to the proxy response database 230 to generate a response in response to a query when the sub processor 201 executes proxy response (mDNS protocol and other protocols). The proxy response database 230 includes data that the name resolution RR 210 (FIG. 4) stores. The sub processor 201 refers to data stored in the name resolution RR 210 when the sub processor 201 executes the mDNS proxy response program 220. In other words, the proxy response database 230 stores the name resolution RR 210 (FIG. 4) in a database structure. Specifically, the proxy response database 230 registers combinations of the NAME 231, the TYPE 232, and the RDATA 233.

FIG. 8 shows an example of an unsupported service database.

The unsupported service database 240 is a database in which services unsupported by the information processing apparatus 10 are registered. Specifically, the unsupported service database 240 registers combinations of the NAME 241 and the TYPE 242.

The communication interface 300 is communicative with an external device connected to the network N. The communication interface 300 is an interface of the physical layer of an interface such as Ethernet (registered trademark). The communication interface 300 converts logical signals into actual electronic signals. The communication interface 300 outputs data such as Ethernet (registered trademark) frames and packets received via the network N to the main controller 100 or the sub controller 200 via the switcher 400. The data such as Ethernet (registered trademark) frames and packets will be hereinafter referred to as "packet". The communication interface 300 sends packets, which are output from the main controller 100 or the sub controller 200 via the switcher 400, to the network N.

When the main processor 101 shifts from the normal mode to the sleep mode and when the main processor 101 recovers from the sleep mode to start the normal mode, the switcher 400 obtains information from the main processor 101. During the normal mode, the switcher 400 outputs packets, which the communication interface 300 receives via the network N, to the main controller 100, and outputs packets, which are obtained from the main controller 100, to the communication interface 300. During the sleep mode, the switcher 400 outputs packets, which the communication interface 300 receives via the network N, to the sub controller 200, and outputs packets, which are obtained from the sub controller 200, to the communication interface 300.

2. Flow of mDNS Proxy Response Program

Figure 6:
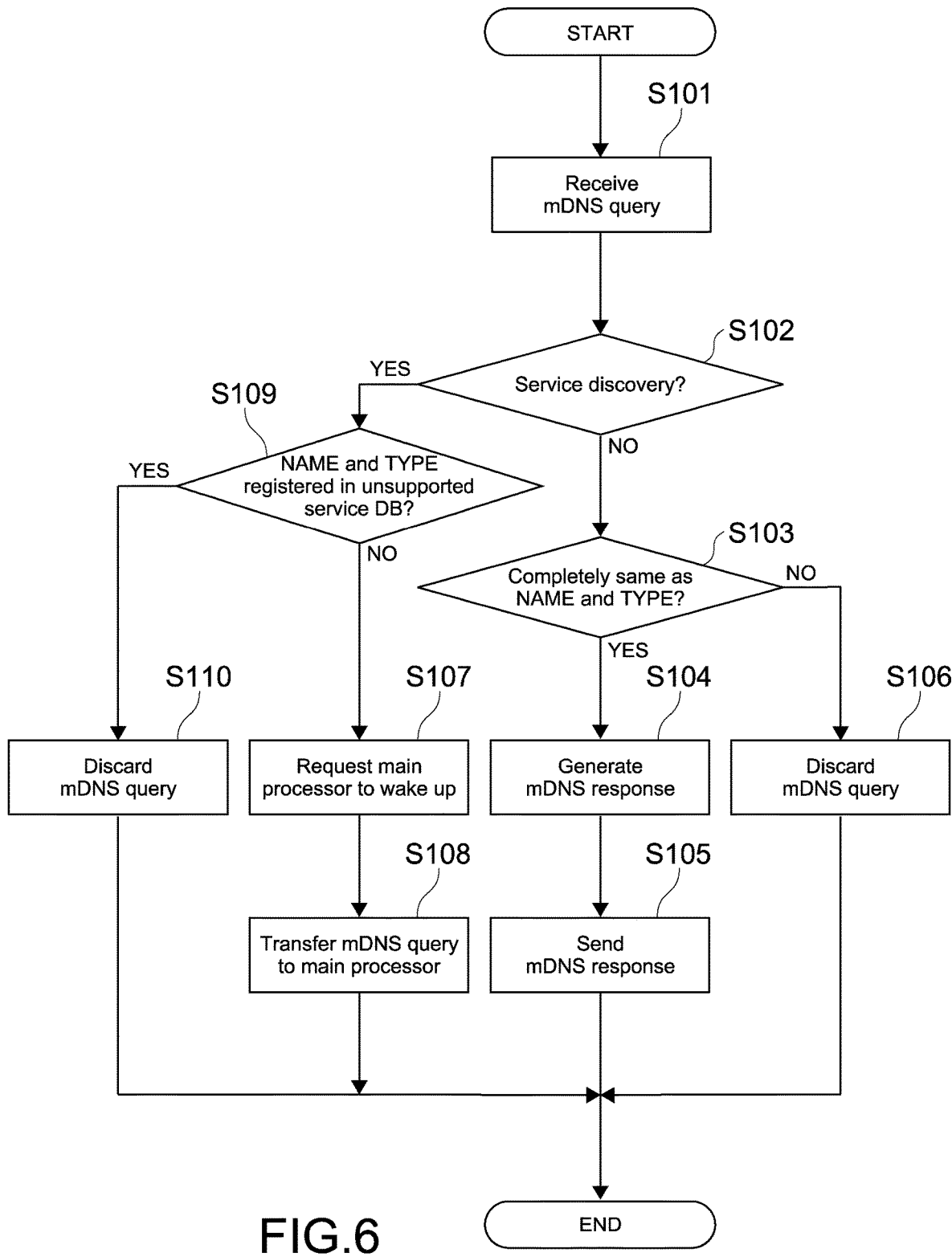
FIG. 6 shows a flow of the mDNS proxy response program.

FIG. 6 shows a flow of the mDNS proxy response program.

During the sleep mode, the sub processor 201 executes the mDNS proxy response program 220. The sub processor 201 executes the processing as illustrated in the flow.

During the sleep mode, the sub processor 201 receives an mDNS query packet from an external device (not shown) via the communication interface 300 (Step S101).

The sub processor 201 determines whether or not the received mDNS query packet is a service discovery query packet (Step S102). Specifically, the sub processor 201 determines whether or not the mDNS query packet is a service discovery query packet based on a part of information described in the mDNS query packet. More specifically, the sub processor 201 determines whether or not the mDNS query packet is a service discovery query packet based on information described in a part of QNAME (name) and information described in QTYPE (type) described in the mDNS query packet.

More specifically, the sub processor 201 determines that the mDNS query packet is a service discovery query packet if the sub processor 201 determines that, in the mDNS query packet, (1) an end of the QNAME is "_udp.local", and the QTYPE is "PTR", (2) an end of the QNAME is "_tcp.local", and the QTYPE is "PTR", (3) a front of the QNAME is a device name, and an end of the QNAME is "_tcp.local", or (4) a front of the QNAME is a device name, and an end of the QNAME is "_udp.local".

Typically, an mDNS query packet is received, then it is determined whether or not the QNAME and the QTYPE of the mDNS query packet are completely the same as the NAME and the TYPE of the RR of an electronic device, and, if the QNAME and the QTYPE are completely the same as the NAME and the TYPE, an mDNS response packet is generated and sent. In other words, typically, information described in a part of an mDNS query packet is not extracted, and determination process is not executed based on that information. To the contrary, according to the present embodiment, it is determined whether or not an mDNS query packet is a service discovery query packet based on information described in a part of QNAME and information described in QTYPE described in the mDNS query packet. According to this method, the sub processor 201 can reliably determine whether or not the mDNS query packet is a service discovery query packet.

With reference to FIG. 1, for example, in the first mDNS query packet 31A, the end of the QNAME 32A is "_tcp.local", and the QTYPE 33A is "PTR". So the first mDNS query packet 31A satisfies the condition (2). Therefore the sub processor 201 determines that the first mDNS query packet 31A is a service discovery query packet. For another example, in the second mDNS query packet 31B, the front of the QNAME 32B is the device name "TaskalfaXXX", and the end of the QNAME 32B is "_tcp.local". So the second mDNS query packet 31B satisfies the condition (3). Therefore the sub processor 201 determines that the second mDNS query packet 31B is a service discovery query packet. The same applies to the third mDNS query packet 31C.

Meanwhile, with reference to FIG. 3, none of the first mDNS query packets 51A, 51B, and 51C satisfies the conditions (1), (2), (3), and (4). Therefore the sub processor 201 determines that none of the first mDNS query packets 51A, 51B, and 51C is a service discovery query packet.

With reference to FIG. 6 again, the sub processor 201 determines that the mDNS query packet is not a service discovery query packet (Step S102, NO). Then, the sub processor 201 determines that the mDNS query packet is a name resolution query packet. If the QNAME and the QTYPE in the mDNS query packet are completely the same as the NAME and the TYPE in the name resolution RR 210 (Step S103, YES), the sub processor 201 generates an mDNS response packet (method similar to that of FIG. 3) (Step S104). The sub processor 201 sends the mDNS response packet to the external device via the communication interface 300 (Step S105).

Meanwhile, if the QNAME and the QTYPE in the mDNS query packet are not completely the same as the NAME and the TYPE in the name resolution RR 210 (Step S103, NO), the sub processor 201 discards the mDNS query packet (Step S106).

Meanwhile, the sub processor 201 determines that the mDNS query packet is a service discovery query packet (Step S102, YES). Then, the sub processor 201 determines whether or not the combination of the QNAME and the QTYPE described in the mDNS query packet is registered in the unsupported service database 240 as the NAME 241 and the TYPE 242 (Step S109).

The sub processor 201 determines that the combination of the QNAME and the QTYPE described in the mDNS query packet is registered in the unsupported service database 240 (Step S109, YES). In this case, the sub processor 201 determines that the service described in the mDNS query packet is a service unsupported by the information processing apparatus 10. Therefore the sub processor 201 discards the mDNS query packet (Step S110).

Meanwhile, the sub processor 201 determines that the combination of the QNAME and the QTYPE described in the mDNS query packet is not registered in the unsupported service database 240 (Step S109, NO). In this case, the sub processor 201 requests the main processor 101 to recover from the sleep mode to start the normal mode (wake up) (Step S107). The sub processor 201 receives, from the main processor 101, information that the main processor 101 recovers from the sleep mode to start the normal mode. Then the sub processor 201 transfers the mDNS query packet to the main processor 101 (Step S108).

3. Flow of Service Discovery Program

Figure 9:
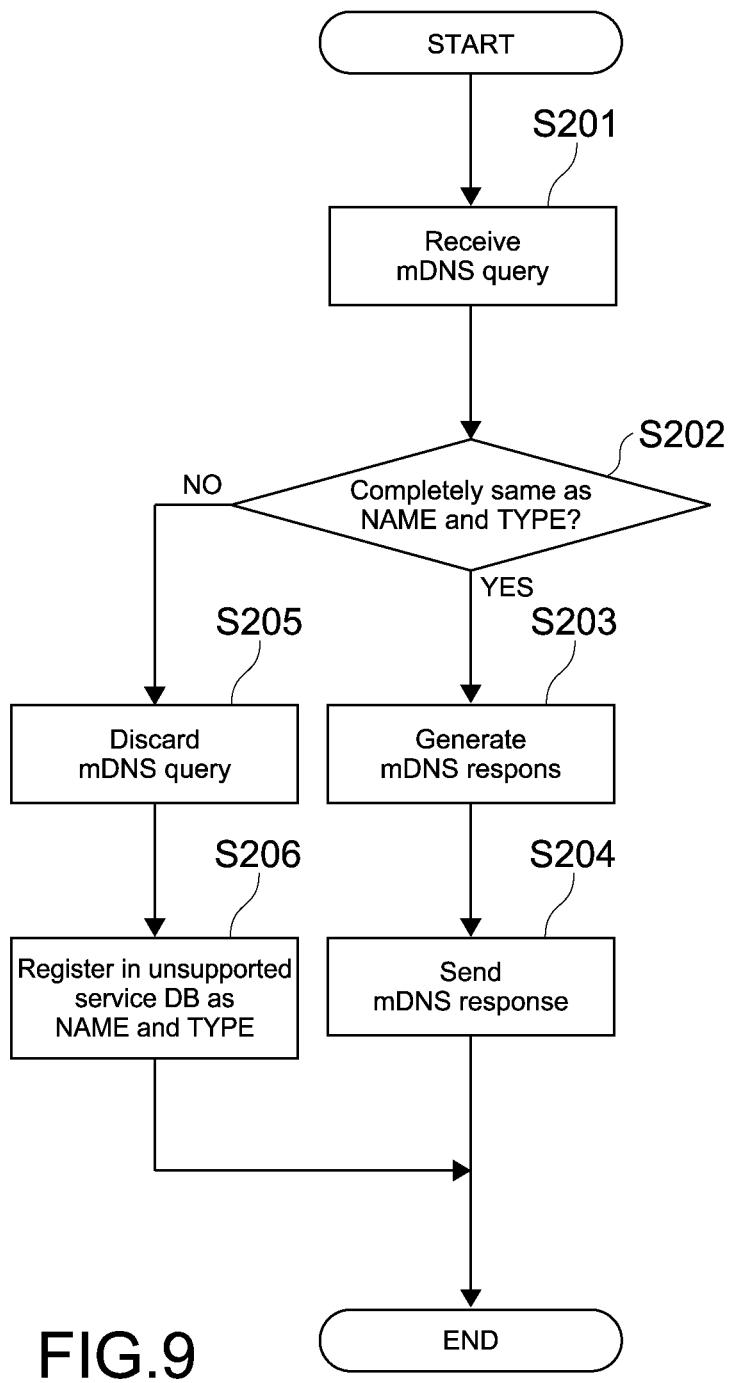
FIG. 9 shows a flow of the service discovery program.

FIG. 9 shows a flow of the service discovery program.

In response to the request from the sub processor 201, the main processor 101 recovers from the sleep mode to start the normal mode. The main processor 101 receives the mDNS query packet from the sub processor 201 (Step S201), and then executes the service discovery program 120. With reference to the service discovery RR 110, the main processor 101 determines whether or not the service described in the mDNS query is a service supported by the information processing apparatus 10. Specifically, the main processor 101 determines whether or not the QNAME and the QTYPE in the mDNS query packet are completely the same as the NAME and the TYPE in the service discovery RR 110 (Step S202).

With reference to the service discovery RR 110, the main processor 101 determines that the service described in the mDNS query is a service supported by the information processing apparatus 10. Specifically, the main processor 101 determines that the QNAME and the QTYPE in the mDNS query packet are completely the same as the NAME and the TYPE in the service discovery RR 110 (Step S202, YES). Then, the main processor 101 generates an mDNS response packet based on the service discovery RR 110 (method similar to that of FIG. 1) (Step S203). The main processor 101 sends the mDNS response packet to the external device via the communication interface 300 (Step S204).

Meanwhile, with reference to the service discovery RR 110, the main processor 101 determines that the service described in the mDNS query is a service unsupported by the information processing apparatus 10. Specifically, the main processor 101 determines that the QNAME and the QTYPE in the mDNS query packet are not completely the same as the NAME and the TYPE in the service discovery RR 110 (Step S202, NO). Then, the main processor 101 discards the mDNS query packet (Step S205).

Further, the main processor 101 registers the QNAME and the QTYPE in the discarded mDNS query packet in the unsupported service database 240 as the NAME 241 and the TYPE 242 (Step S206).

4. Conclusion

In many cases, an electronic device is selectively executable a normal mode and a sleep mode (main controller is powered off, and sub controller responds (proxy response)) for energy saving. In such an electronic device, if a sub controller receives an mDNS query packet in the sleep mode, typically, a main controller always recovers from the sleep mode to start the normal mode, and responds to the mDNS query. Since the data size of the RR is too large (see FIG. 2 and FIG. 4) to store in the low-volume sub ROM and the process of generating a response packet is complicated (see FIG. 1 and FIG. 3), a low-spec sub controller cannot process the mDNS query.

Meanwhile, since mDNS employs multicast communication, for example, if many electronic devices are connected to an in-office LAN (Local Area Network), each electronic device may frequently receive mDNS query packets directed to other electronic devices. As a result, a main controller may frequently recover from the sleep mode to start the normal mode. This is because a sub controller cannot determine that received mDNS query packets are directed to other electronic devices. This situation is not desirable from a viewpoint of energy saving.

To the contrary, according to a conceivable method, if an electronic device receives mDNS query packets in a sleep mode, a sub controller always processes all the received mDNS query packets and responds to all the received mDNS query packets (proxy response). In order to realize this method, it is necessary to increase the volume of the sub ROM such that the sub ROM can store the service discovery RR and the name resolution RR, and it is necessary to increase the specs of the sub processor and the sub RAM such that the sub processor and the sub RAM can process service discovery queries and name resolution queries appropriately. However, according to this method, it is necessary to develop a larger number of information processing steps, which increases costs. In addition, energy consumption of a sub controller is increased, which is not desired from a viewpoint of energy saving.

Meanwhile, as described above, the mDNS protocol can execute the service discovery and the name resolution. The service discovery RR and the name resolution RR are used to respond to mDNS queries. The number of records in the service discovery RR (FIG. 2) is the same as the number of the services supported by a device. Further, the service discovery RR is a layer-structure database including the service information (upper layer), the device name information (middle layer), and the service detailed information (lower layer). Meanwhile, the name resolution RR (FIG. 4) only includes information of the host name and the IP address (IPv4 address, IPv6 address). In other words, the data size of the service discovery RR is relatively larger than the data size of the name resolution RR. Similarly, the process of extracting data for a response from the layer-structure service discovery RR (FIG. 1) is relatively more complicated than the process of extracting data for a response from the relatively-simple name resolution RR (FIG. 3).

In view of the aforementioned circumstances, according to the present embodiment, the main controller 100 has the service discovery RR 110, and the sub controller 200 has the name resolution RR 210. If the sub controller 200 receives an mDNS query in the sleep mode, the sub controller 200 determines whether or not the mDNS query is a service discovery query based on a part of information described in the mDNS query. If the mDNS query is not a service discovery query, the sub controller 200 determines that the mDNS query is a name resolution query, and responds to the mDNS query based on the name resolution RR 210 (proxy response). Meanwhile, if the mDNS query is a service discovery query, the sub controller 200 determines whether or not the service described in the mDNS query is registered in the unsupported service database 240. If the service described in the mDNS query is registered in the unsupported service database 240, the sub controller 200 discards the mDNS query. Meanwhile, if the service described in the mDNS query is not registered in the unsupported service database 240, the sub controller 200 requests the main controller 100 to recover from the sleep mode to start the normal mode, and transfers the mDNS query to the main controller 100. The main controller 100 responds to the mDNS query based on the service discovery RR 110. Meanwhile, if the main controller 100 determines that the service described in the mDNS query is a service unsupported by the information processing apparatus 10, the main controller 100 registers the service described in the mDNS query in the unsupported service database 240.

In short, if the sub controller 200 receives an mDNS query packet in the sleep mode, the sub controller 200 responds to the mDNS query packet without recovering from the sleep mode to start the normal mode, if the mDNS query is not a service discovery query. In other words, if the sub controller 200 receives an mDNS query packet, only if the mDNS query is a service discovery query and the service described in the mDNS query is not registered in the unsupported service database 240, the main controller 100 recovers from the sleep mode to start the normal mode, and the main controller 100 responds to the mDNS query.

As a result, the number of times of recovering from the sleep mode to start the normal mode is decreased, and the number of times of responding by the sub controller 200 (proxy response) is increased. Therefore the energy saving performance is increased. Further, it is not necessary to increase the spec of the sub controller 200. Therefore the sub controller 200 by itself operates with low energy consumption (energy saving), and increase in cost can be prevented.

Further, after the main controller 100 recovers from the sleep mode, if the main controller 100 determines that the service described in the mDNS query is a service unsupported by the information processing apparatus 10, the main controller 100 registers the service (service unsupported by the information processing apparatus 10) described in the mDNS query in the unsupported service database 240. As a result, if the sub controller 200 receives the same mDNS query packet in the sleep mode next time, since the service described in the mDNS query is registered in the unsupported service database 240, the sub controller 200 discards the mDNS query, and it is not necessary for the main controller 100 to recover from the sleep mode. As a result, the number of times of recovering from the sleep mode to start the normal mode is more and more decreased as the time passes. As a result, the energy saving performance is more and more increased as the time passes.

Meanwhile, it is supposed that the sub controller 200 does not have the service discovery RR 110 and only has the name resolution RR 210, similar to the present embodiment. In this case, the sub controller 200 can only determine whether or not the received mDNS query is a name resolution query directed to the information processing apparatus 10 itself. Specifically, if the combination of the QNAME and the QTYPE of the received mDNS query (name resolution query) is completely the same as the combination of the NAME and the TYPE of any one record of the name resolution RR 210, the sub controller 200 can determine that the received mDNS query is a name resolution query directed to the information processing apparatus 10 itself. However, the combination of the QNAME and the QTYPE of the received mDNS query (name resolution query) may not always be completely the same as the combination of the NAME and the TYPE of any one record of the name resolution RR 210. In this case, the sub controller 200 can only determine that the received mDNS query is a name resolution query not directed to the information processing apparatus 10 itself. However, the sub controller 200 cannot determine whether the received mDNS query is a name resolution query directed to another electronic device or a service discovery query. Therefore the sub controller 200 should always request the main controller 100 to recover from the sleep mode to start the normal mode and transfer the mDNS query to the main controller 100 if the mDNS query is not a name resolution query directed to the information processing apparatus 10 itself (i.e., if the mDNS query is a service discovery query, and, in addition, if the mDNS query is a name resolution query directed to another electronic device).

To the contrary, according to the present embodiment, as different from the aforementioned supposition, the sub controller 200, which only has the name resolution RR 210, does not firstly determine whether or not the received mDNS query is a name resolution query directed to the information processing apparatus 10 itself. The sub controller 200 firstly determine whether or not the mDNS query is a service discovery query based on a part of information described in the received mDNS query. As a result, according to the present embodiment, if the sub controller 200 determines that the mDNS query is not a service discovery query (i.e., the mDNS query is a name resolution query), with reference to the name resolution RR 210, the sub controller 200 responds to the mDNS query if the mDNS query is a name resolution query directed to the information processing apparatus 10 itself (proxy response). If the mDNS query is a name resolution query directed to another electronic device, the sub controller 200 discards the mDNS query. In other words, only if the mDNS query is a service discovery query, the sub controller 200 requests the main controller 100 to recover from the sleep mode to start the normal mode, and transfers the mDNS query to the main controller 100. As a result, the number of times of recovering from the sleep mode to start the normal mode is more decreased than that of the aforementioned supposition (to recover from the sleep mode to start the normal mode if an mDNS query is a service discovery query, and, in addition, if an mDNS query is a name resolution query directed to another electronic device).

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
a sub controller including a sub memory and a sub processor, the sub memory storing a proxy response database including a name resolution RR (Resource Record) that is used to generate a response in response to a name resolution query based on an mDNS (Multicast Domain Name System) protocol;
a main controller including a main memory and a main processor, the main memory storing a service discovery RR that is used to generate a response in response to a service discovery query based on the mDNS protocol, the main controller informing the sub processor that the main controller shifts to a sleep mode and recovers from the sleep mode; and a communication interface communicative with an external device connected to a network, wherein the sub processor, in the sleep mode, receives an mDNS query from the external device via the communication interface, then determines whether or not the mDNS query is a service discovery query based on information described in a part of QNAME (name) and information described in QTYPE (type) described in the mDNS query, if determining that the mDNS query is not a service discovery query, determines that the mDNS query is a name resolution query, generates the response based on the name resolution RR, and sends the response to the external device via the communication interface.

2. The information processing apparatus according to claim 1, wherein the sub processor determines that the mDNS query is a service discovery query if the sub processor determines that, in the mDNS query, (1) an end of the QNAME is "_udp.local", and the QTYPE is "PTR", (2) an end of the QNAME is "_tcp.local", and the QTYPE is "PTR", (3) a front of the QNAME is a device name, and an end of the QNAME is "_tcp.local", or (4) a front of the QNAME is a device name, and an end of the QNAME is "_udp.local".

3. The information processing apparatus according to claim 1, wherein the sub memory further stores an unsupported service database registering a service unsupported by the information processing apparatus, and the sub processor if determining that the mDNS query is a service discovery query, determines whether or not a service described in the mDNS query is registered in the unsupported service database, if determining that the service described in the mDNS query is not registered in the unsupported service database, requests the main processor to recover from the sleep mode, and transfers the mDNS query to the main processor.

4. The information processing apparatus according to claim 3, wherein the main processor recovers from the sleep mode in response to the request from the sub processor, receives the mDNS query from the sub processor, the mDNS query being the service discovery query, determines whether or not the service described in the mDNS query is a service supported by the information processing apparatus, and if determining that the service described in the mDNS query is a service unsupported by the information processing apparatus, registers the service described in the mDNS query in the unsupported service database.

5. The information processing apparatus according to claim 3, wherein the unsupported service database registers NAME (name) and TYPE (type) of a service unsupported by the information processing apparatus, and the sub processor determines whether or not a service described in the mDNS query is registered in the unsupported service database based on whether or not a combination of QNAME (name) and QTYPE (type) described in the mDNS query is registered in the unsupported service database.

6. The information processing apparatus according to claim 3, wherein the sub processor if determining that a service described in the mDNS query is registered in the unsupported service database, discards the mDNS query.

7. A non-transitory computer readable recording medium that records an information processing program for an information processing apparatus including a sub controller including a sub memory and a sub processor, the sub memory storing a proxy response database including a name resolution RR (Resource Record) that is used to generate a response in response to a name resolution query based on an mDNS (Multicast Domain Name System) protocol, a main controller including a main memory and a main processor, the main memory storing a service discovery RR that is used to generate a response in response to a service discovery query based on the mDNS protocol, the main controller informing the sub processor that the main controller shifts to a sleep mode and recovers from the sleep mode, and a communication interface communicative with an external device connected to a network, the program causing the sub processor, in the sleep mode of the main controller:

to receive an mDNS query from the external device via the communication interface; then to determine whether or not the mDNS query is a service discovery query based on information described in a part of QNAME (name) and information described in QTYPE (type) described in the mDNS query;

if determining that the mDNS query is not a service discovery query, to determine that the mDNS query is a name resolution query;

to generate the response based on the name resolution RR; and to send the response to the external device via the communication interface.

* * * * *